(12) United States Patent
Matsuoka (10) Patent No.: US 12,018,748 B2
(45) Date of Patent: Jun. 25, 2024

(54) DRIVE UNIT

(71) Applicant: EXEDY Corporation, Neyagawa (JP)

(72) Inventor: Yoshihiro Matsuoka, Neyagawa (JP)

(73) Assignee: EXEDY Corporation, Osaka (JP)

( * ) Notice: Subject to any disclaimer, the term of this patent is extended or adjusted under 35 U.S.C. 154(b) by 5 days.

(21) Appl. No.: 17/947,454

(22) Filed: Sep. 19, 2022

(65) Prior Publication Data

US 2023/0118246 A1     Apr. 20, 2023

(30) Foreign Application Priority Data

Oct. 19, 2021   (JP) .................. 2021-170751

(51) Int. Cl.
| | |
|---|---|
| *F16H 47/06* | (2006.01) |
| *F16H 61/00* | (2006.01) |
| *F16H 61/02* | (2006.01) |
| *F16H 61/16* | (2006.01) |

(52) U.S. Cl.
CPC ..... *F16H 61/0206* (2013.01); *F16H 61/0025* (2013.01); *F16H 61/16* (2013.01); *F16H 47/06* (2013.01); *F16H 2200/0021* (2013.01)

(58) Field of Classification Search
CPC .. F16H 47/06; F16H 61/0025; F16H 61/0206; F16H 61/16; F16H 2200/0021; B60K 17/10
See application file for complete search history.

(56) References Cited

FOREIGN PATENT DOCUMENTS

| | | | |
|---|---|---|---|
| JP | 2001-287556 | * | 10/2001 |
| JP | 5370233 B2 | | 12/2013 |

* cited by examiner

*Primary Examiner* — William C Joyce
(74) *Attorney, Agent, or Firm* — United IP Counselors, LLC (57) ABSTRACT

A drive unit includes a motor, a torque converter, a torque transmission member, first and second transmission paths, first and second gear trains, and a controller. The torque converter amplifies torque directed in a first direction. The first transmission path transmits torque through the torque converter. The second transmission path transmits torque without through the torque converter. The first gear train outputs torque directed in the first direction as forward torque. The second gear train outputs torque directed in the first direction as reverse torque. The controller executes a first forward moving mode such that the motor is rotated in the first direction, and torque is outputted through the first transmission path and the first gear train. The controller executes a second forward moving mode such that the motor is rotated in a second direction, and torque is outputted through the second transmission path and the second gear train.

7 Claims, 9 Drawing Sheets

DRIVE UNIT

CROSS-REFERENCE TO RELATED APPLICATIONS

This application claims priority to Japanese Patent Application No. 2021-170751 filed Oct. 19, 2021. The entire contents of that application are incorporated by reference herein in their entirety.

TECHNICAL FIELD

The present invention relates to a drive unit.

BACKGROUND ART

Electric cars travel using a motor as a drive source. The electric cars move forward by forwardly rotating the motor and move backward by reversely rotating the motor. There has been proposed a type of electric car in which a torque converter is installed in order to amplify a torque outputted from the motor (e.g., Publication of Japan Patent No. 5370233).

It is desirable for the electric car configured as described above to implement a plurality of forward moving modes without complexity in structure. In view of this, it is an object of the present invention to provide a drive unit by which a plurality of forward moving modes can be implemented without complexity in structure.

BRIEF SUMMARY

A drive unit according to an aspect of the present invention is configured to drive a drive part. The drive unit includes a motor, a torque converter, a torque transmission member, first and second torque transmission paths, first and second gear trains, and a controller. The motor is configured to be rotatable in a first rotational direction and a second rotational direction reverse to the first rotational direction. The torque converter is configured to amplify a torque outputted from the motor when the torque is directed in the first rotational direction. The torque transmission member receives the torque transmitted thereto from the torque converter. The first torque transmission path is configured to transmit the torque outputted from the motor to the torque transmission member through the torque converter. The second torque transmission path is configured to transmit the torque outputted from the motor to the torque transmission member without passing through the torque converter. The first and second gear trains are disposed downstream with respect to the torque transmission member in a torque transmission sequence. The first gear train is configured to output the torque outputted from the motor when the torque is directed in the first rotational direction as a forward rotation directional torque. The second gear train is configured to output the torque outputted from the motor when the torque is directed in the first rotational direction as a reverse rotation directional torque. The controller executes a first forward moving mode and a second forward moving mode. The controller executes the first forward moving mode such that the motor is controlled to be rotated in the first rotational direction and the torque is outputted through the first torque transmission path and the first gear train. The controller executes the second forward moving mode such that the motor is controlled to be rotated in the second rotational direction and the torque is outputted through the second torque transmission path and the second gear train.

According to this configuration, on the one hand, forward moving can be made when the controller executes the first forward moving mode such that the motor is rotated in the first rotational direction and the torque is outputted through the first gear train for forward moving. On the other hand, forward moving can be made as well when the controller executes the second forward moving mode such that the motor is rotated in the second rotational direction and the torque is outputted through the second gear train for reverse moving. In other words, two forward moving modes can be implemented with the first gear train for forward moving and the second gear train for reverse moving. Because of this, a plurality of forward moving modes can be implemented without providing a plurality of gear trains for forward moving, in other words, without complexity in structure. Besides, in the second forward moving mode that the motor is rotated in the second rotational direction, transmission of the torque is made through the second torque transmission path without passing through the torque converter; hence, transmission of the torque can be efficiently made by omitting installation of an unneeded torque transmission path.

Preferably, the drive unit further includes a one-way clutch. The one-way clutch is disposed in the second torque transmission path. The one-way clutch is configured to allow transmission of the torque outputted from the motor when the torque is directed in the second rotational direction and block transmission of the torque outputted from the motor when the torque is directed in the first rotational direction. According to this configuration, the one-way clutch enables transmission of the torque directed in the first rotational direction through the first torque transmission path and enables transmission of the torque directed in the second rotational direction through the second torque transmission path. Because of this, transmission of the torque can be made through an appropriate one of the torque transmission paths without controlling the torque transmission paths by the controller.

The drive unit can further include a control clutch instead of the one-way clutch. The control clutch is disposed in the second torque transmission path. The control clutch is configured to be controlled by the controller. The control clutch is configured to be switchable between a transmission allowing state and a transmission blocking state. The control clutch allows transmission of the torque outputted from the motor when switched into the transmission allowing state. The control clutch blocks transmission of the torque outputted from the motor when switched into the transmission blocking state. The controller executes a third forward moving mode. The controller executes the third forward moving mode such that the motor is controlled to be rotated in the first rotational direction and the torque is outputted through the second torque transmission path and the first gear train. According to this configuration, three forward moving modes can be implemented.

Preferably, the controller executes a first reverse moving mode and a second reverse moving mode. The controller executes the first reverse moving mode such that the motor is controlled to be rotated in the first rotational direction and the torque is outputted through the first torque transmission path and the second gear train. The controller executes the second reverse moving mode such that the motor is controlled to be rotated in the second rotational direction and the torque is outputted through the second torque transmission path and the first gear train. According to this configuration, two reverse moving modes can be implemented without providing a plurality of gear trains for reverse moving.

Preferably, the first gear train is higher in gear ratio than the second gear train.

Preferably, a ratio (G1/G2) of a gear ratio (G1) of the first gear train to a gear ratio (G2) of the second gear train is lower than a torque ratio of the torque converter.

Preferably, the drive unit further includes a hydraulic pump. The hydraulic pump is configured to supply a hydraulic pressure to the torque converter. The controller stops actuation of the hydraulic pump when the motor is rotated in the second rotational direction.

Overall, according to the present invention, a plurality of forward moving modes can be implemented without complexity in structure.

DETAILED DESCRIPTION

Figure 1:
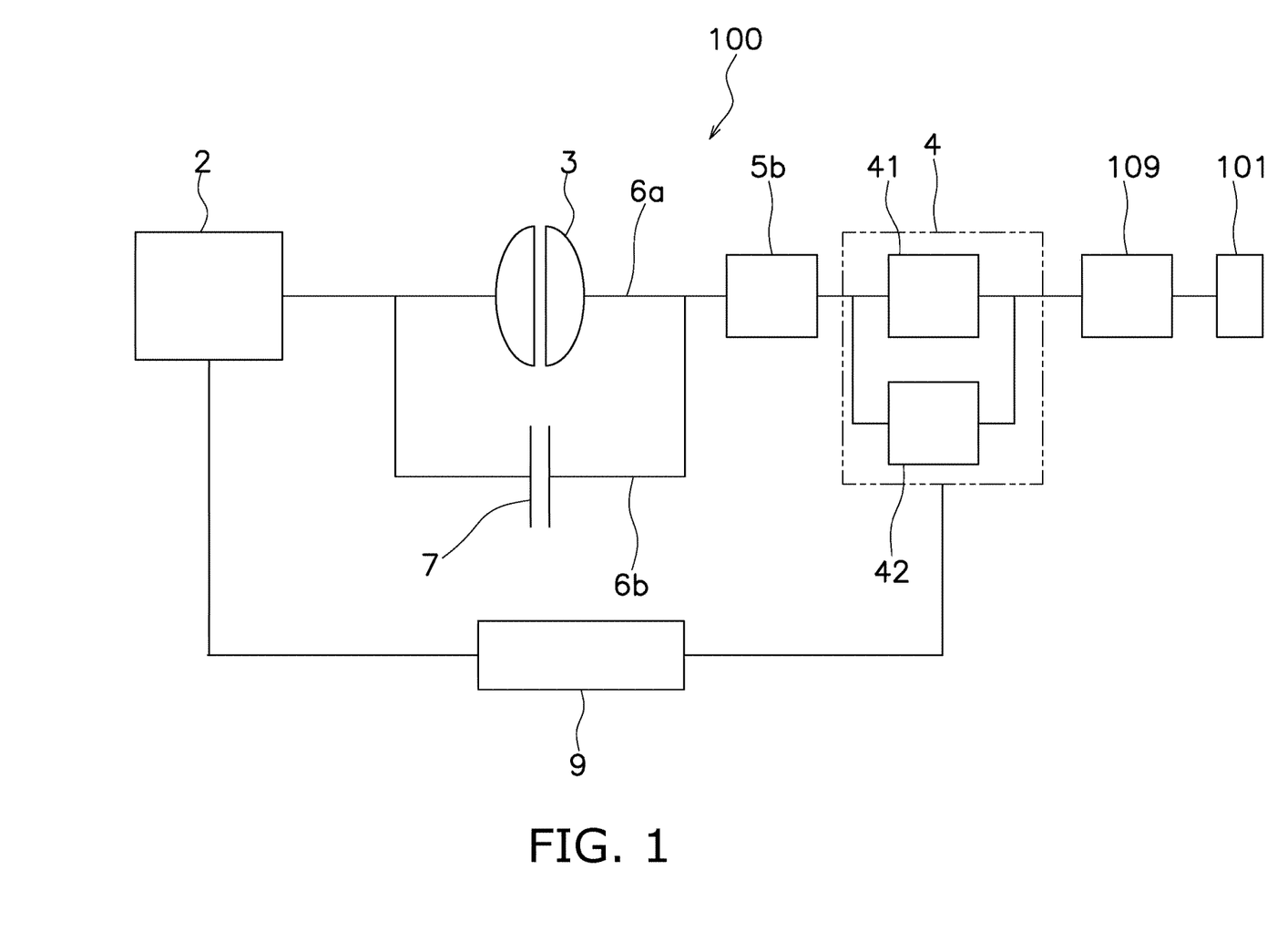
FIG. 1 is a block diagram showing torque transmission paths in a drive unit.
Figure 2:
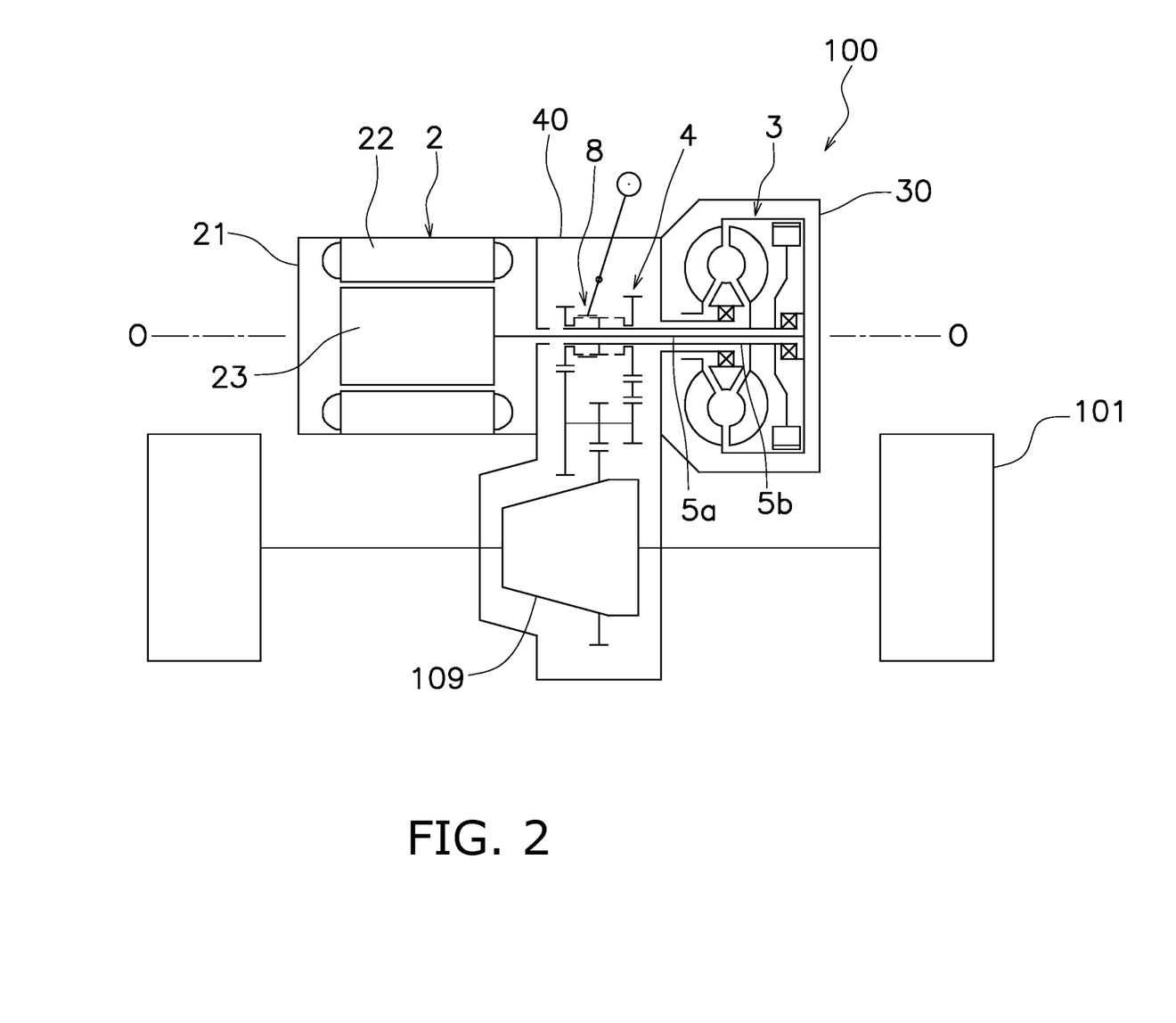
FIG. 2 is a schematic diagram of the drive unit.

A drive unit according to the present preferred embodiment will be hereinafter explained with reference to drawings. FIG. 1 is a block diagram showing torque transmission paths in the drive unit, whereas FIG. 2 is a schematic diagram of the drive unit. It should be noted that in the following explanation, the term "axial direction" refers to an extending direction of a rotational axis O for both a motor 2 and a torque converter 3. On the other hand, the term "circumferential direction" refers to a circumferential direction of an imaginary circle about the rotational axis O, whereas the term "radial direction" refers to a radial direction of the imaginary circle about the rotational axis O. Besides, FIG. 1 omits illustration of some members.

[Drive Unit 100]

As shown in FIGS. 1 and 2, the drive unit (100) is configured to drive a drive wheel 101 (exemplary drive part). The drive unit 100 includes the motor 2, the torque converter 3, first and second torque transmission shafts 5a and 5b, first and second torque transmission paths 6a and 6b, a first one-way clutch 7, a torque output part 4, a switch mechanism 8, and a controller 9. The drive unit 100 is installed in, for instance, an electric car. It should be noted that the second torque transmission shaft 5b corresponds to a torque transmission member in the present invention. On the other hand, the first one-way clutch 7 corresponds to a one-way clutch in the present invention.

<Motor>

The motor 2 includes a motor casing 21, a stator 22, and a rotor 23. In the present preferred embodiment, the motor 2 is a so-called inner rotor motor. The motor 2 is configured to be rotatable in both a first rotational direction and a second rotational direction. It should be noted that the second rotational direction is a rotational direction reverse to the first rotational direction.

The motor casing 21 is non-rotatable, while being fixed to a body frame of the vehicle. The stator 22 is fixed to the inner peripheral surface of the motor casing 21. The stator 22 is non-rotatable. The rotor 23 is rotated about the rotational axis O. The rotor 23 is disposed radially inside the stator 22.

<Torque Converter>

The torque converter 3 is disposed axially apart from the motor 2 at an interval. The torque output part 4 is disposed between the torque converter 3 and the motor 2. The motor 2, the torque output part 4, and the torque converter 3 are axially aligned in this order.

The rotational axis O of the torque converter 3 is substantially matched with that of the motor 2. The torque converter 3 receives a torque transmitted thereto from the motor 2. Then, the torque converter 3 is configured to amplify the torque outputted from the motor 2 when the torque is directed in the first rotational direction. It should be noted that the torque converter 3 does not amplify the torque outputted from the motor 2 when the torque is directed in the second rotational direction. The torque converter 3 outputs the amplified torque to the torque output part 4.

Figure 3:
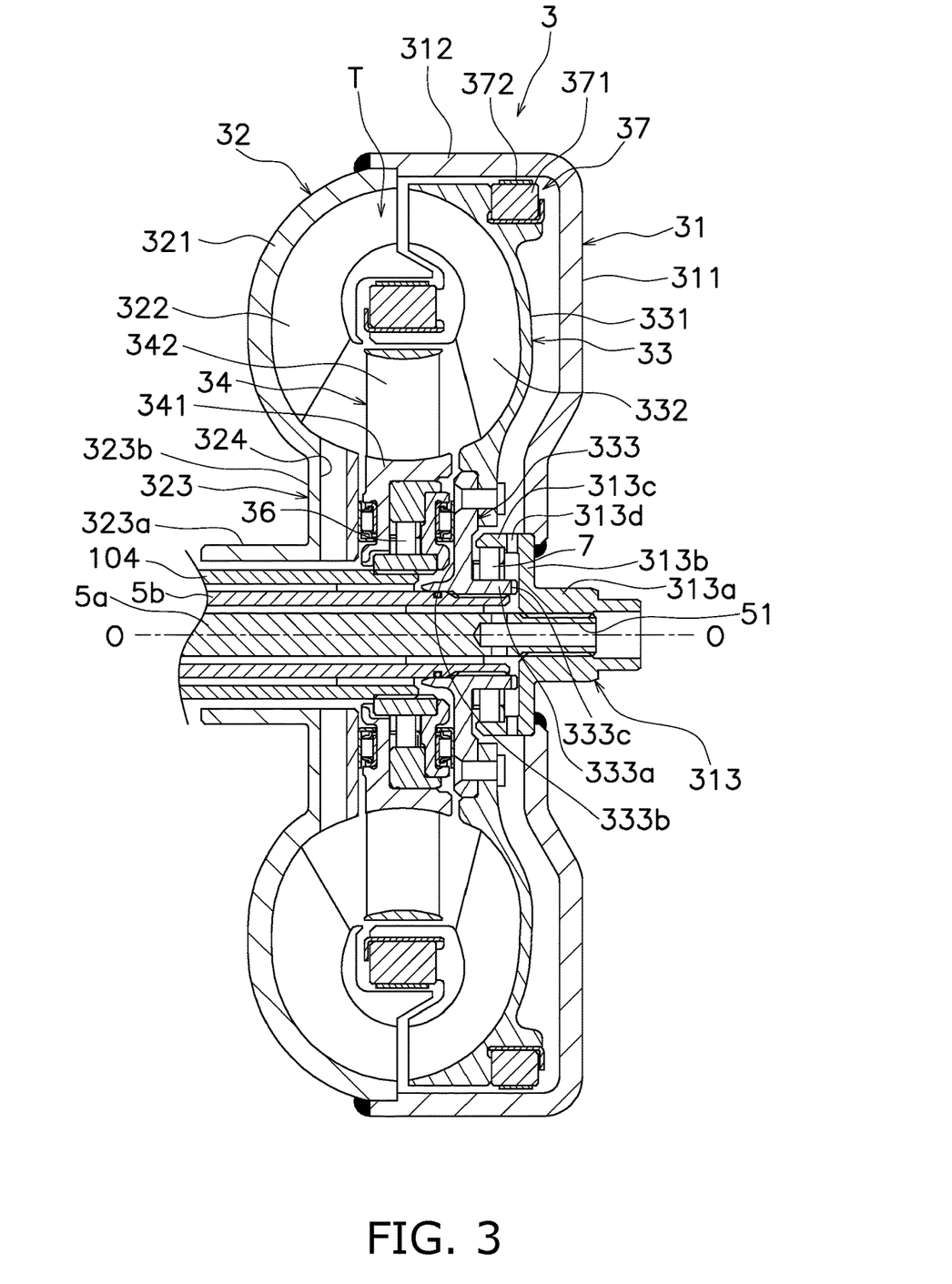
FIG. 3 is a cross-sectional view of a torque converter.

As shown in FIG. 3, the torque converter 3 includes a cover 31, an impeller 32, a turbine 33, a stator 34, and a second one-way clutch 36. Besides, the torque converter 3 further includes a centrifugal clutch 37.

The torque converter 3 is disposed such that the impeller 32 faces the motor 2 (the left side in FIG. 3), whereas the cover 31 faces opposite to the motor 2 (the right side in FIG. 3). The torque converter 3 is accommodated in the interior of a torque converter casing 30. Hydraulic fluid is supplied to the interior of the torque converter 3. The hydraulic fluid is, for instance, hydraulic oil.

The cover 31 is a component to which the torque, outputted from the motor 2, is inputted. The cover 31 is rotated by the torque inputted thereto from the motor 2. The cover 31 is fixed to the first torque transmission shaft 5a extending from the motor 2. For example, the cover 31 includes a spline hole to which the first torque transmission shaft 5a is spline-coupled. Because of this, the cover 31 is unitarily rotated with the first torque transmission shaft 5a. The cover 31 is disposed to cover the turbine 33.

The cover 31 includes a disc portion 311, a cylindrical portion 312, and a cover hub 313. The disc portion 311 includes an opening in the middle thereof. The cylindrical portion 312 extends from the outer peripheral end of the disc portion 311 toward the motor 2. The disc portion 311 and the cylindrical portion 312 are provided as a single member integrated with each other.

The cover hub 313 is fixed to the inner peripheral end of the disc portion 311. In the present preferred embodiment, the cover hub 313 is provided as a different member separated from the disc portion 311. However, the cover hub 313 can be provided as a single member integrated with the disc portion 311.

The cover hub 313 includes a first boss portion 313a, a first flange portion 313b, and a protruding portion 313c. The first boss portion 313a, the first flange portion 313b, and the protruding portion 313c are provided as a single member integrated with each other.

The first boss portion 313a has a cylindrical shape and includes the spline hole. The first torque transmission shaft 5a is spline-coupled to the first boss portion 313a. The first boss portion 313a is rotatably supported by the torque converter casing 30 through a bearing member (not showing in the drawings). Because of this, the first boss portion 313a axially extends from the first flange portion 313b to the opposite side of the motor 2.

The first flange portion 313b extends radially outward from the first boss portion 313a. When described in detail, the first flange portion 313b extends radially outward from the motor 2-side end of the first boss portion 313a. The disc portion 311 is fixed to the outer peripheral end of the first flange portion 313b.

The protruding portion 313c axially extends from the first flange portion 313b. The protruding portion 313c extends toward the motor 2. The protruding portion 313c extends from the outer peripheral end of the first flange portion 313b. The protruding portion 313c has a cylindrical shape. The protruding portion 313c includes a plurality of through holes 313d. The hydraulic fluid is discharged from the torque converter 3 through the through holes 313d.

The impeller 32 is unitarily rotated with the cover 31. The impeller 32 is fixed to the cover 31. The impeller 32 includes an impeller shell 321, a plurality of impeller blades 322, an impeller hub 323, and a plurality of supply flow pathways 324.

The impeller shell 321 is fixed to the cover 31. The plural impeller blades 322 are attached to the inner surface of the impeller shell 321.

The impeller hub 323 is attached to the inner peripheral end of the impeller shell 321. It should be noted that in the present preferred embodiment, the impeller hub 323 is provided as a single member integrated with the impeller shell 321, but alternatively, can be provided as a different member separated from the impeller shell 321.

The impeller hub 323 includes a second boss portion 323a and a second flange portion 323b. The second boss portion 323a has a cylindrical shape and axially extends. The second boss portion 323a is rotatably supported, through a bearing member (not shown in the drawings), by the torque converter casing 30. A stationary shaft 104 axially extends through the interior of the second boss portion 323a. It should be noted that the stationary shaft 104 has a cylindrical shape and a second torque transmission shaft 5b axially extends through the interior of the stationary shaft 104. Besides, the stationary shaft 104 extends from, for instance, a transmission casing 40 or the torque converter casing 30. The stationary shaft 104 is non-rotatable.

The supply flow pathways 324 are provided in the impeller hub 323. When described in detail, the supply flow pathways 324 are provided in the second flange portion 323b. The supply flow pathways 324 extend radially outward from the inner peripheral surface of the impeller hub 323. Besides, the supply flow pathways 324 are opened to the interior of a torus T. It should be noted that the torus T is a space enclosed by the impeller 32 and the turbine 33.

Figure 4:
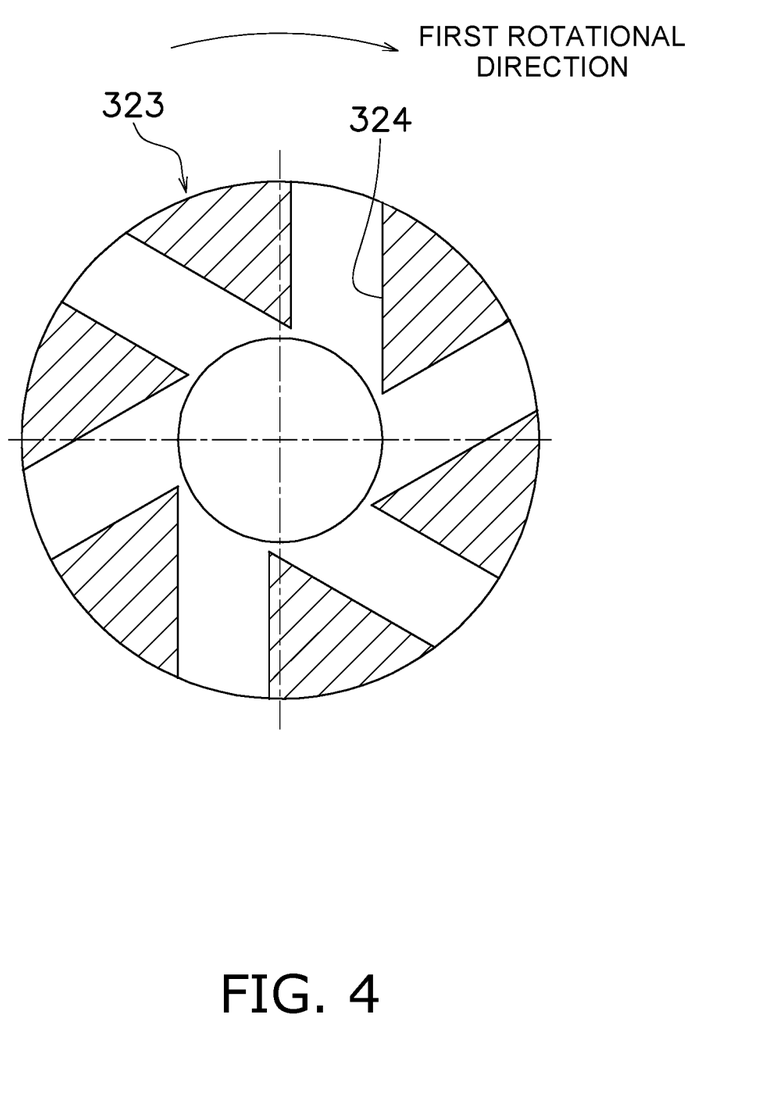
FIG. 4 is a cross-sectional view of an impeller hub.

The supply flow pathways 324 are axially closed. In other words, the supply flow pathways 324 are through holes radially extending in the impeller hub 323. As shown in FIG. 4, the supply flow pathways 324 extend in a radial shape. The supply flow pathways 324 slant opposite to the rotational direction, while extending radially outward.

As shown in FIG. 3, the turbine 33 is disposed in opposition to the impeller 32. When described in detail, the turbine 33 is axially opposed to the impeller 32. The turbine 33 is a component to which the torque is transmitted from the impeller 32 through the hydraulic fluid.

The turbine 33 includes a turbine shell 331, a plurality of turbine blades 332, and a turbine hub 333. The plural turbine blades 332 are fixed to the inner surface of the turbine shell 331.

The turbine hub 333 is fixed to the inner peripheral end of the turbine shell 331. For example, the turbine hub 333 is fixed to the turbine shell 331 by rivets. In the present preferred embodiment, the turbine hub 333 is provided as a different member separated from the turbine shell 331. However, the turbine hub 333 can be provided as a single member integrated with the turbine shell 331.

The second torque transmission shaft 5b is attached to the turbine hub 333. When described in detail, the second torque transmission shaft 5b is spline-coupled to the turbine hub 333. The turbine hub 333 is unitarily rotated with the second torque transmission shaft 5b.

The turbine hub 333 includes a third boss portion 333a and a third flange portion 333b. The third boss portion 333a and the third flange portion 333b are provided as a single member integrated with each other.

The third boss portion 333a has a cylindrical shape and includes a spline hole. The second torque transmission shaft 5b is spline-coupled to the third boss portion 333a. The third boss portion 333a axially extends from the third flange portion 333b to the opposite side of the motor 2. In other words, the third boss portion 333a axially extends from the third flange portion 333b toward the cover hub 313.

The third boss portion 333a is disposed radially apart from the protruding portion 313c at an interval. In other words, the protruding portion 313c is disposed radially outside the third boss portion 333a. The first one-way clutch 7 is disposed between the third boss portion 333a and the protruding portion 313c. It should be noted that without installation of the first one-way clutch 7, the outer peripheral surface of the third boss portion 333a and the inner peripheral surface of the protruding portion 313c are opposed to each other.

At least one flow pathway is provided between the cover hub 313 and the distal end of the third boss portion 333a such that the hydraulic fluid flows therethrough. In the present preferred embodiment, the third boss portion 333a is provided with a plurality of cutouts 333c on the distal end thereof. The cutouts 333c radially extend on the distal end of the third boss portion 333a. The hydraulic fluid is discharged from the torque converter 3 through the cutouts 333c and the through holes 313d.

The third flange portion 333b extends radially outward from the third boss portion 333a. When described in detail, the third flange portion 333b extends radially outward from the motor 2-side end of the third boss portion 333a. The turbine shell 331 is fixed to the outer peripheral end of the third flange portion 333b by the rivets or so forth.

The stator 34 is configured to regulate the flow of the hydraulic oil returning from the turbine 33 to the impeller 32. The stator 34 is rotatable about the rotational axis O. For example, the stator 34 is supported by the stationary shaft 104 through the second one-way clutch 36. The stator 34 is disposed axially between the impeller 32 and the turbine 33.

The stator 34 includes a stator carrier 341 having a disc shape and a plurality of stator blades 342 attached to the outer peripheral surface of the stator carrier 341.

The second one-way clutch 36 is disposed between the stationary shaft 104 and the stator 34. The second one-way clutch 36 is configured to make the stator 34 forwardly rotatable in the first rotational direction. By contrast, the second one-way clutch 36 makes the stator 34 non-rotatable in the second rotational direction. The torque is transmitted from the impeller 32 to the turbine 33, while being amplified by the stator 34.

The centrifugal clutch 37 is attached to the turbine 33. The centrifugal clutch 37 is unitarily rotated with the turbine 33. The centrifugal clutch 37 is configured to couple the cover 31 and the turbine 33 to each other by a centrifugal force generated in rotation of the turbine 33. When described in detail, the centrifugal clutch 37 is configured to transmit the torque from the cover 31 to the turbine 33 when the rotational speed of the turbine 33 becomes greater than or equal to a predetermined value.

The centrifugal clutch 37 includes a plurality of centrifugal elements 371 and a plurality of friction materials 372. The friction materials 372 are attached to the outer peripheral surfaces of the centrifugal elements 371, respectively. The centrifugal elements 371 are disposed to be radially movable. It should be noted that the centrifugal elements 371 are disposed to be circumferentially immovable. Because of this, the centrifugal elements 371 are rotated together with the turbine 33 and are moved radially outward by centrifugal forces.

When the rotational speed of the turbine 33 becomes greater than or equal to the predetermined value, the centrifugal clutch 37 is configured such that the centrifugal elements 371 are moved radially outward and the friction materials 372 are engaged by friction with the inner peripheral surface of the cylindrical portion 312 of the cover 31. As a result, the centrifugal clutch 37 is turned to an on state, and the torque inputted to the cover 31 is transmitted therefrom to the turbine 33 through the centrifugal clutch 37. It should be noted that even when the centrifugal clutch 37 is turned to the on state, the hydraulic fluid is flowable through the centrifugal clutch 37.

When the rotational speed of the turbine 33 becomes less than the predetermined value, the centrifugal elements 371 are moved radially inward, whereby the friction materials 372 and the inner peripheral surface of the cylindrical portion 312 of the cover 31, engaged by friction, are disengaged from each other. As a result, the centrifugal clutch 37 is turned to an off state, and the torque inputted to the cover 31 is not transmitted therefrom to the turbine 33 through the centrifugal clutch 37. In other words, the torque inputted to the cover 31 is transmitted therefrom to the impeller 32 and is then transmitted to the turbine 33 through the hydraulic fluid.

<First Torque Transmission Shaft>

As shown in FIGS. 2 and 3, the first torque transmission shaft 5a extends from the motor 2. When described in detail, the first torque transmission shaft 5a extends from the rotor 23 of the motor 2. The first torque transmission shaft 5a extends toward the torque converter 3. The rotational axis of the first torque transmission shaft 5a is substantially matched with that of the motor 2 and that of the torque converter 3.

The first torque transmission shaft 5a transmits the torque, outputted thereto from the motor 2, to the torque converter 3. The first torque transmission shaft 5a is attached at the distal end thereof to the cover hub 313 of the torque converter 3. The first torque transmission shaft 5a is unitarily rotated with the rotor 23 of the motor 2. The first torque transmission shaft 5a extends through the interior of the second torque transmission shaft 5b. The first torque transmission shaft 5a is solid. The first torque transmission shaft 5a includes a communicating pathway 51 in the distal end thereof. The communicating pathway 51 extends in the axial direction. Besides, the communicating pathway 51 communicates with an oil pathway (not shown in the drawings).

<Second Torque Transmission Shaft>

The second torque transmission shaft 5b receives the torque transmitted thereto from the torque converter 3. The second torque transmission shaft 5b outputs the torque, inputted thereto from the torque converter 3, to the torque output part 4. The second torque transmission shaft 5b axially extends from the torque converter 3 toward the motor 2.

The second torque transmission shaft 5b has a cylindrical shape. The first torque transmission shaft 5a extends through the interior of the second torque transmission shaft 5b. The second torque transmission shaft 5b is attached at one end (the right end in FIG. 3) to the turbine 33 of the torque converter 3. On the other hand, the second torque transmission shaft 5b is rotatably supported at the other end, for instance, by the transmission casing 40 through a bearing member and/or so forth.

<First and Second Torque Transmission Paths>

As shown in FIG. 1, the first torque transmission path 6a is configured to transmit a torque, outputted from the motor 2, to the second torque transmission shaft 5b through the torque converter 3. Specifically, the torque is transmitted through the first torque transmission path 6a in the order of the first torque transmission shaft 5a, the torque converter 3, and the second torque transmission shaft 5b. More specifically, the torque is transmitted through the first torque transmission path 6a in the order of the first torque transmission shaft 5a, the cover 31, the impeller 32, the turbine 33, and the second torque transmission shaft 5b (see FIG. 3).

The second torque transmission path 6b is configured to transmit the torque, outputted from the motor 2, to the second torque transmission shaft 5b without passing through the torque converter 3. Specifically, the torque is transmitted through the second torque transmission path 6b in the order of the first torque transmission shaft 5a, the first one-way clutch 7, and the second torque transmission shaft 5b. More specifically, the torque is transmitted through the second torque transmission path 6b in the order of the first torque transmission shaft 5a, the cover 31, the turbine 33, and the second torque transmission shaft 5b (see FIG. 3). In other words, torque transmission is made without passing through the hydraulic oil inside the torque converter 3.

<First One-Way Clutch>

The first one-way clutch 7 is disposed in the second torque transmission path 6b. The first one-way clutch 7 is configured to allow transmission of the torque outputted from the motor 2 when the torque is directed in the second rotational direction. By contrast, the first one-way clutch 7 is configured to block transmission of the torque outputted from the motor 2 when the torque is directed in the first rotational direction. Because of this, when the motor 2 is rotated in the second rotational direction, torque transmission is made through the second torque transmission path 6b. By contrast, when the motor 2 is rotated in the first rotational direction, torque transmission is made not through the second torque transmission path 6b but through the first torque transmission path 6a. In other words, when the motor 2 is rotated in the first rotational direction, the torque is transmitted to the torque converter 3; conversely, when the motor 2 is rotated in the second rotational direction, the torque is transmitted to the second torque transmission shaft 5b without passing through the torque converter 3.

As shown in FIG. 3, specifically, the first one-way clutch 7 is disposed between the cover 31 and the turbine 33. When the torque is outputted from the motor 2 so as to be directed in the first rotational direction and is inputted to the first one-way clutch 7, the first one-way clutch 7 makes the cover 31 rotatable relative to the turbine 33. Because of this, when the motor 2 is rotated in the first rotational direction, the first one-way clutch 7 does not transmit the torque from the cover 31 to the turbine 33. In other words, the first one-way clutch 7 blocks transmission of the torque outputted from the motor 2 when the torque is directed in the first rotational direction;

hence, transmission of the torque is made not via the second torque transmission path 6b but via the first torque transmission path 6a.

By contrast, when the torque is outputted from the motor 2 so as to be directed in the second rotational direction and is inputted to the first one-way clutch 7, the first one-way clutch 7 makes the cover 31 unitarily rotate with the turbine 33. Because of this, when the motor 2 is rotated in the second rotational direction, the first one-way clutch 7 allows transmission of the torque from the cover 31 to the turbine 33. In other words, when the torque is outputted from the motor 2 so as to be directed in the second rotational direction, transmission of the torque is made via the second torque transmission path 6b.

<Torque Output Part>

As shown in FIG. 2, the torque output part 4 is disposed axially between the motor 2 and the torque converter 3. The torque output part 4 is accommodated in the interior of the transmission casing 40. The torque output part 4 is disposed downstream with respect to the second torque transmission shaft 5b in a torque transmission sequence.

The torque output part 4 outputs the torque, inputted thereto from the second torque transmission shaft 5b, toward the drive wheel 101. When described in detail, the torque output part 4 outputs the torque to the drive wheel 101 through a differential gear 109. It should be noted that as described below, the torque output part 4 does not output the torque in a neutral mode.

Figure 5:
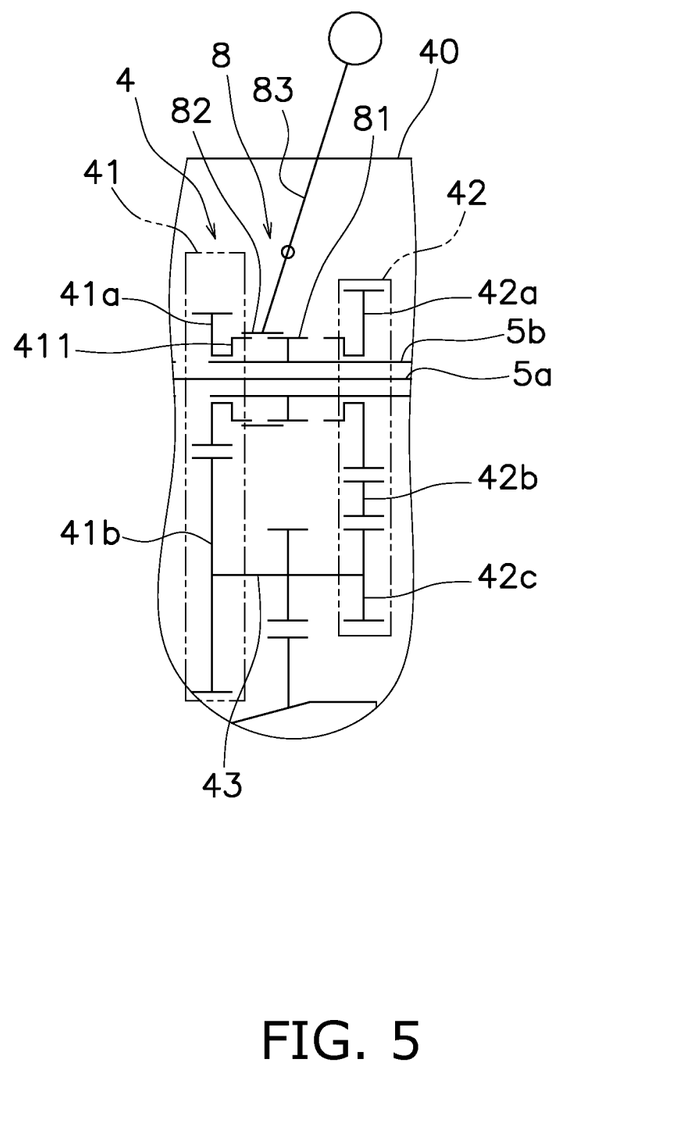
FIG. 5 is a close-up view of a torque output part.

As shown in FIG. 5, the torque output part 4 includes a first gear train 41 and a second gear train 42. The torque output part 4 outputs the torque therefrom through either the first gear train 41 or the second gear train 42.

The first gear train 41 is configured to output the torque, outputted from the motor 2 so as to be directed in the first rotational direction, as a forward rotation directional torque. In other words, the first gear train 41 is configured to output the torque, outputted from the motor 2 so as to be directed in the second rotational direction, as a reverse rotation directional torque. Because of this, when the motor 2 is rotated in the first rotational direction and the torque is outputted therefrom to the drive wheel 101 through the first gear train 41, the vehicle is moved forward. By contrast, when the motor 2 is rotated in the second rotational direction and the torque is outputted therefrom to the drive wheel 101 through the first gear train 41, the vehicle is moved backward.

The second gear train 42 is configured to output the torque, outputted from the motor 2 so as to be directed in the first rotational direction, as a reverse rotation directional torque. In other words, the second gear train 42 is configured to output the torque, outputted from the motor 2 so as to be directed in the second rotational direction, as a forward rotation directional torque. Because of this, when the motor 2 is rotated in the first rotational direction and the torque is outputted therefrom to the drive wheel 101 through the second gear train 42, the vehicle is moved backward. By contrast, when the motor 2 is rotated in the second rotational direction and the torque is outputted therefrom to the drive wheel 101 through the second gear train 42, the vehicle is moved forward.

The first gear train 41 includes a first gear 41a and a second gear 41b that are meshed with each other. The first gear 41a is supported by the second torque transmission shaft 5b, while being rotatable relative thereto. When a ring gear 82 of the switch mechanism 8 (to be described) is meshed with the first gear 41a, the first gear 41a is unitarily rotated with the second torque transmission shaft 5b.

The second gear 41b is supported by a drive shaft 43. The second gear 41b is unitarily rotated with the drive shaft 43. The second gear 41b outputs the torque, inputted thereto from the first gear 41a, to the drive shaft 43.

The second gear train 42 includes a third gear 42a, a fourth gear 42b, and a fifth gear 42c. The number of gears in the second gear train 42 is greater by one than that in the first gear train 41. The third gear 42a is supported by the second torque transmission shaft 5b, while being rotatable relative thereto. When the ring gear 82 of the switch mechanism 8 (to be described) is meshed with the third gear 42a, the third gear 42a is unitarily rotated with the second torque transmission shaft 5b.

The fourth gear 42b is meshed with the third gear 42a. The fourth gear 42b is supported by a countershaft (not shown in the drawings). The fourth gear 42b can be rotated unitarily with or relative to the countershaft.

The fifth gear 42c is meshed with the fourth gear 42b. The fifth gear 42c is supported by the drive shaft 43. The fifth gear 42c is unitarily rotated with the drive shaft 43. The fifth gear 42c outputs the torque, transmitted thereto from the third gear 42a, to the drive shaft 43.

The first gear train 41 is different in gear ratio from the second gear train 42. When described in detail, the first gear train 41 is higher in gear ratio than the second gear train 42. Preferably, a ratio (G1/G2) of the gear ratio (G1) of the first gear train 41 to the gear ratio (G2) of the second gear train 42 is lower than a torque ratio of the torque converter 3. It should be noted that the torque ratio of the torque converter 3 refers to a ratio (output torque/input torque) of an output torque outputted from the torque converter 3 to an input torque inputted to the torque converter 3.

The torque output part 4 can be set to any of a first output mode, a second output mode, and the neutral mode. When in the first output mode, the torque output part 4 outputs the torque through the first gear train 41. On the other hand, when in the second output mode, the torque output part 4 outputs the torque through the second gear train 42. By contrast, when in the neutral mode, the torque output part 4 does not output the torque inputted thereto from the torque converter 3.

<Switch Mechanism>

The switch mechanism 8 is configured to switch the torque output part 4 from one to another among the first output mode, the second output mode, and the neutral mode. The switch mechanism 8 includes a clutch hub 81 and the ring gear 82. It should be noted that the switch mechanism 8 can include a lever 83.

The clutch hub 81 is attached to the second torque transmission shaft 5b. The clutch hub 81 is unitarily rotated with the second torque transmission shaft 5b. The clutch hub 81 can be provided as a single member integrated with the second torque transmission shaft 5b, or alternatively, can be provided as a different member separated from the second torque transmission shaft 5b. The clutch hub 81 includes a plurality of teeth on the outer peripheral surface thereof.

The ring gear 82 includes a plurality of teeth on the inner peripheral surface thereof. The ring gear 82 is constantly meshed with the clutch hub 81 and is unitarily rotated therewith. In other words, the ring gear 82 is unitarily rotated with the second torque transmission shaft 5b. The ring gear 82 is disposed to be movable in the axial direction.

As shown in FIG. 5, the ring gear 82 is meshed with the clutch hub 81 and is also capable of being turned to a state of engagement with the first gear 41a. When described in detail, the first gear 41a includes a first cylindrical portion 411 protruding in the axial direction. The first cylindrical portion 411 includes a plurality of teeth on the outer peripheral surface thereof. The ring gear 82 is herein meshed with the outer peripheral surface of the first cylindrical portion 411.

When the ring gear 82 is meshed with the clutch hub 81 and the first cylindrical portion 411 as described above, the torque output part 4 is set to the first output mode. In other words, the torque, inputted to the torque output part 4 from the second torque transmission shaft 5b, is outputted through the first gear train 41.

Figure 6:
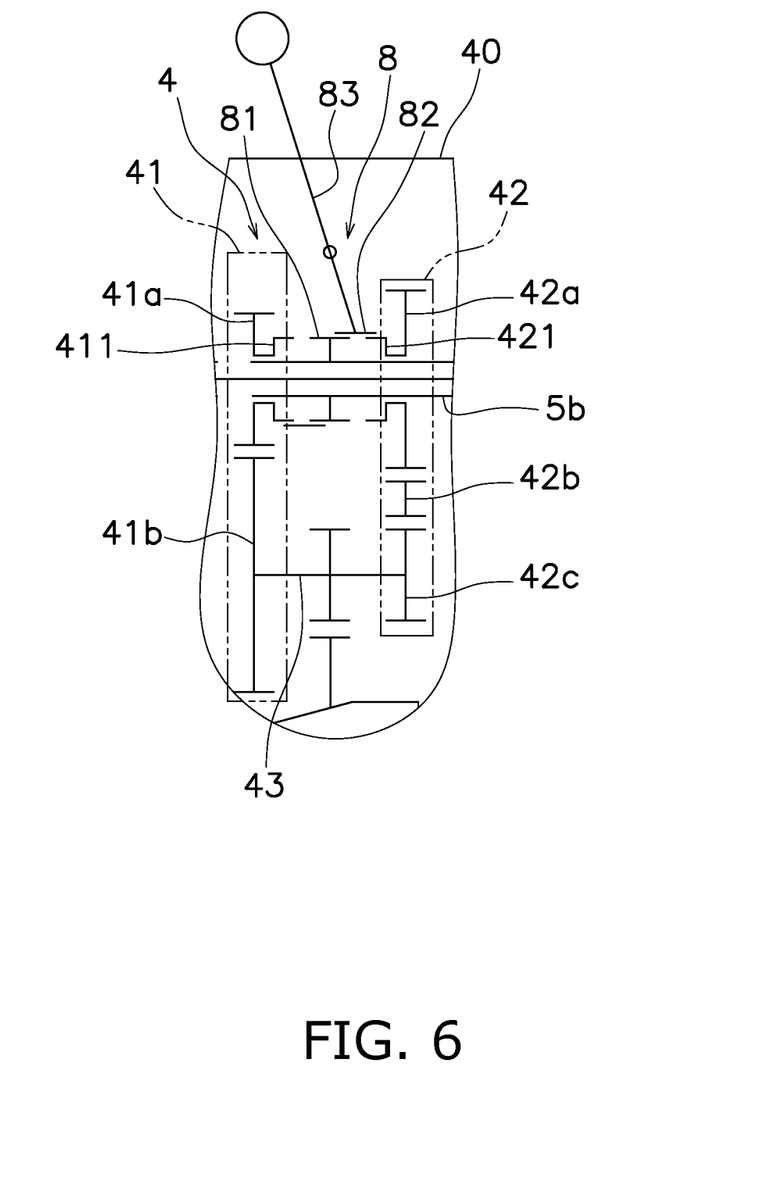
FIG. 6 is a close-up view of the torque output part.

As shown in FIG. 6, the ring gear 82 is meshed with the clutch hub 81 and is also capable of being turned to a state of engagement with the third gear 42a. When described in detail, the third gear 42a includes a second cylindrical portion 421 protruding in the axial direction. The second cylindrical portion 421 includes a plurality of teeth on the outer peripheral surface thereof. The ring gear 82 is herein meshed with the outer peripheral surface of the second cylindrical portion 421.

When the ring gear 82 is meshed with the clutch hub 81 and the second cylindrical portion 421 as described above, the torque output part 4 is set to the second output mode. In other words, the torque, inputted to the torque output part 4 from the second torque transmission shaft 5b, is outputted through the second gear train 42.

Figure 7:
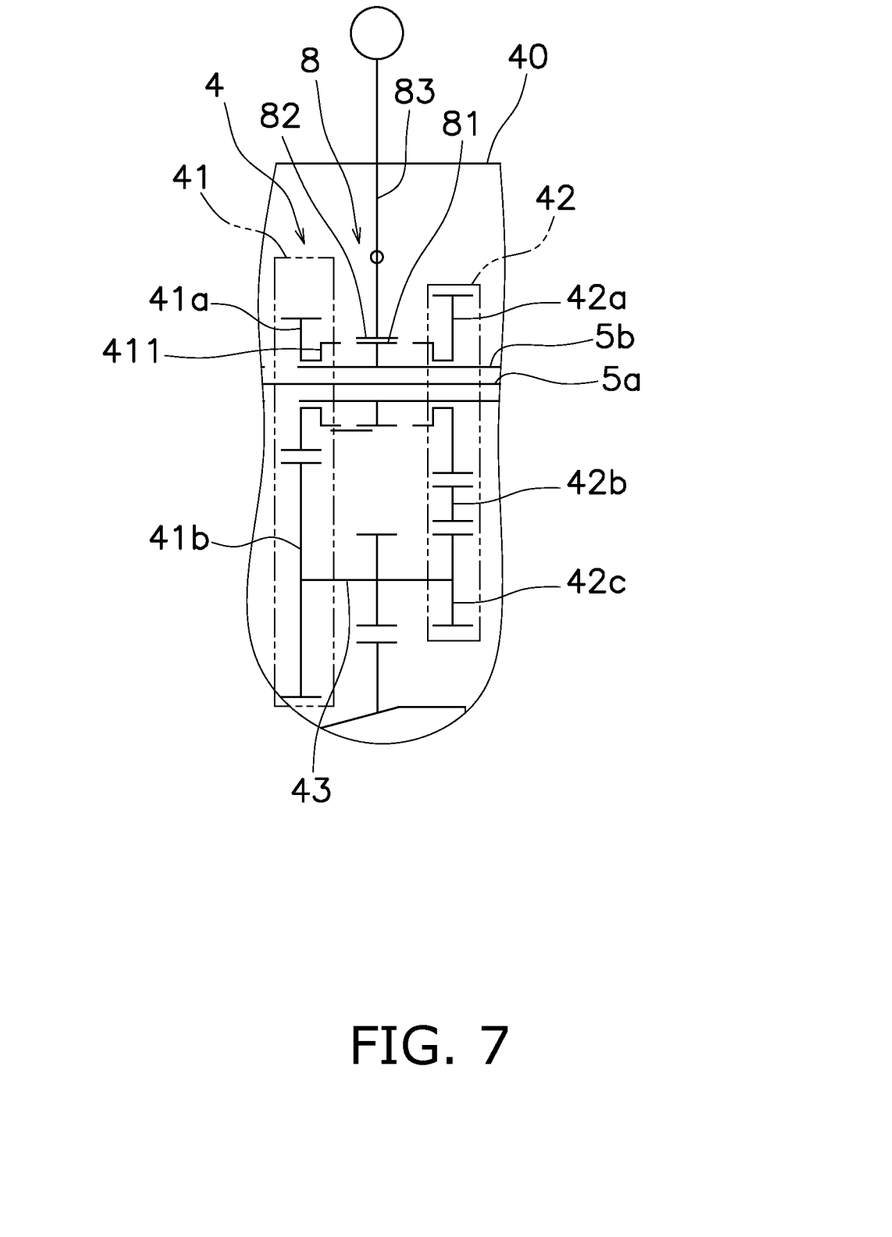
FIG. 7 is a close-up view of the torque output part.

As shown in FIG. 7, the ring gear 82 is capable of being turned to a state of meshing with only the clutch hub 81. When the ring gear 82 is meshed with only the clutch hub 81 without being meshed with both the first and second cylindrical portions 411 and 421 as described above, the torque output part 4 is set to the neutral mode. In other words, the torque, inputted to the torque output part 4 from the second torque transmission shaft 5b, is not outputted toward the drive wheel 101.

The switch mechanism 8 is controlled by the controller 9. The ring gear 82 is axially moved when controlled by the controller 9. The axial movement of the ring gear 82 results in meshing with the clutch hub 81 and the first cylindrical portion 411, meshing with the clutch hub 81 and the second cylindrical portion 421, or meshing with only the clutch hub 81. As a result, the switch mechanism 8 enables the torque output part 4 to be switched from one to another among the first output mode, the second output mode, and the neutral mode.

When the switch mechanism 8 further includes the lever 83, the lever 83 is coupled to the ring gear 82. The lever 83 extends from the ring gear 82 to the outside of the transmission casing 40. The lever 83 is operated by a driver. The ring gear 82 is also axially movable in conjunction with operating the lever 83.

<Controller>

As shown in FIG. 1, the controller 9 is configured to control the motor 2 and the torque output part 4. It should be noted that the controller 9 controls the torque output part 4 by controlling the switch mechanism 8. For example, a computer (e.g., microcomputer), including a CPU (Central Processing Unit), a ROM (Read Only Memory), and so forth, is provided as the controller 9. The ROM stores programs for various computations. The CPU executes the programs stored in the ROM.

The controller 9 executes any of a first forward moving mode, a second forward moving mode, a first reverse moving mode, and a second reverse moving mode. When the controller 9 executes the first or second forward moving mode, the drive unit 100 is actuated to move the vehicle forward. By contrast, when the controller 9 executes the first or second reverse moving mode, the drive unit 100 is actuated to move the vehicle backward.

When executing the first forward moving mode, the controller 9 controls and causes the motor 2 to be rotated in the first rotational direction. Besides, when executing the first forward moving mode, the controller 9 causes the motor 2 and the torque output part 4 to output the torque through the first torque transmission path 6a and the first gear train 41. When described in detail, the controller 9 causes the torque output part 4 to output the torque through the first gear train 41 by controlling the switch mechanism 8.

It should be noted that when the controller 9 controls and causes the motor 2 to be rotated in the first rotational direction, the first one-way clutch 7 blocks transmission of the torque. As a result, the torque, outputted from the motor 2 so as to be directed in the first rotational direction, is transmitted via the first torque transmission path 6a not via the second torque transmission path 6b.

When executing the second forward moving mode, the controller 9 controls and causes the motor 2 to be rotated in the second rotational direction. Besides, when executing the second forward moving mode, the controller 9 causes the motor 2 and the torque output part 4 to output the torque through the second torque transmission path 6a and the second gear train 42. When described in detail, the controller 9 causes the torque output part 4 to output the torque through the second gear train 42 by controlling the switch mechanism 8.

It should be noted that when the controller 9 controls and causes the motor 2 to be rotated in the second rotational direction, the first one-way clutch 7 allows transmission of the torque. As a result, the torque, outputted from the motor 2 so as to be directed in the second rotational direction, is transmitted via the second torque transmission path 6b.

When executing the first reverse moving mode, the controller 9 controls and causes the motor 2 to be rotated in the first rotational direction. Besides, when executing the first reverse moving mode, the controller 9 causes the motor 2 and the torque output part 4 to output the torque through the first torque transmission path 6a and the second gear train 42. When described in detail, the controller 9 causes the torque output part 4 to output the torque through the second gear train 42 by controlling the switch mechanism 8.

It should be noted that when the controller 9 controls and causes the motor 2 to be rotated in the first rotational direction, the first one-way clutch 7 blocks transmission of the torque. As a result, the torque, outputted from the motor 2 so as to be directed in the first rotational direction, is transmitted via the first torque transmission path 6a not via the second torque transmission path 6b.

When executing the second reverse moving mode, the controller 9 controls and causes the motor 2 to be rotated in the second rotational direction. Besides, when executing the second reverse moving mode, the controller 9 causes the motor 2 and the torque output part 4 to output the torque through the second torque transmission path 6a and the first gear train 41. When described in detail, the controller 9 causes the torque output part 4 to output the torque through the first gear train 41 by controlling the switch mechanism 8.

It should be noted that when the controller 9 controls and causes the motor 2 to be rotated in the second rotational direction, the first one-way clutch 7 allows transmission of the torque. As a result, the torque, outputted from the motor 2 so as to be directed in the second rotational direction, is transmitted via the second torque transmission path 6b.

<Actions>

Figure 8:
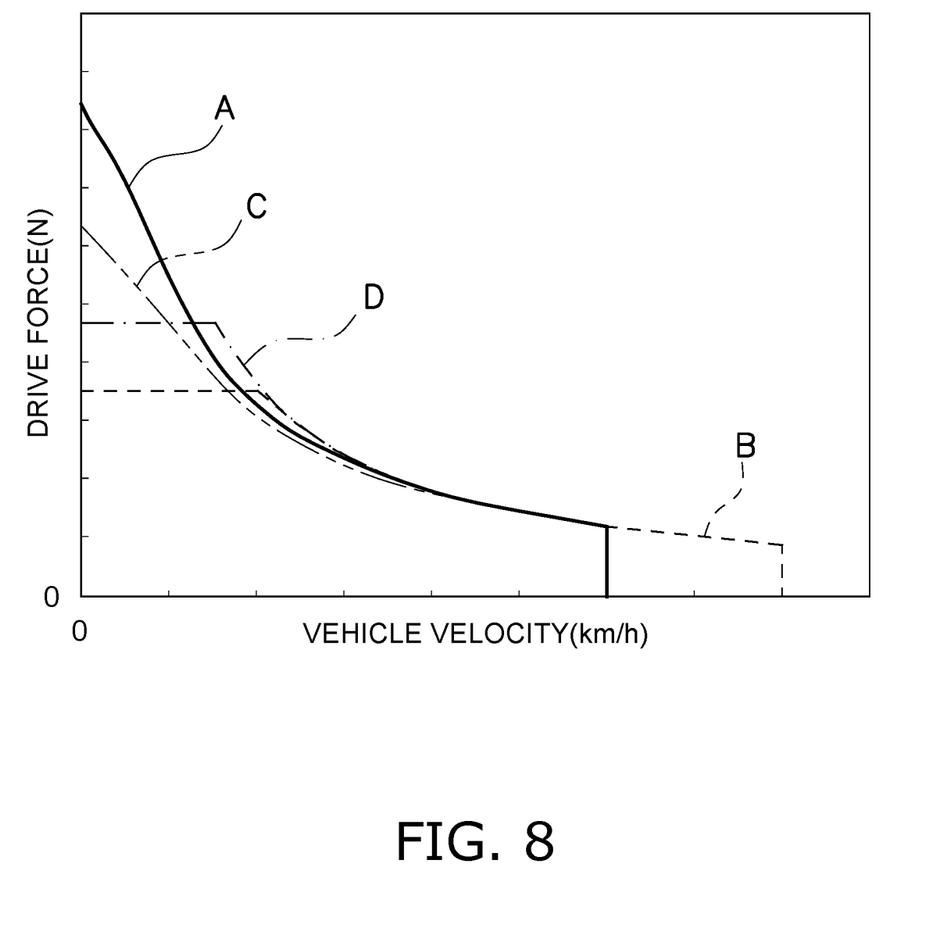
FIG. 8 is a chart showing a relation between vehicle velocity and drive force.

In the drive unit 100 configured as described above, the controller 9 executes either the first forward moving mode or the second forward moving mode when the vehicle is moved forward. It should be noted that either the first forward moving mode or the second forward moving mode can be selected in accordance with operation by the driver or can be selected by the controller 9 based on at least one traveling condition or so forth. Table 1 shows actions of the respective members and so forth in the respective forward moving and reverse moving modes. Drive characteristics A to D in Table 1 correspond to lines A to D in FIG. 8, respectively. It should be noted that FIG. 8 is a chart showing a relation between vehicle velocity and drive force.

TABLE 1

| CONTROLLER | MOTOR | FIRST ONE-WAY CLUTCH | TORQUE CONVERTER | TORQUE OUTPUT PART | MOVING DIRECTION | DRIVE CHARACTERISTICS |
|---|---|---|---|---|---|---|
| $1^{ST}$ FORWARD MOVING MODE | $1^{ST}$ ROTATIONAL DIRECTION | BLOCK | ACTUATED | $1^{ST}$ GEAR TRAIN | FORWARD | A |
| $2^{ND}$ FORWARD MOVING MODE | $2^{ND}$ ROTATIONAL DIRECTION | ALLOW | NOT ACTUATED | $2^{ND}$ GEAR TRAIN | FORWARD | B |
| $1^{ST}$ REVERSE MOVING MODE | $1^{ST}$ ROTATIONAL DIRECTION | BLOCK | ACTUATED | $2^{ND}$ GEAR TRAIN | REVERSE | C |
| $2^{ND}$ REVERSE MOVING MODE | $2^{ND}$ ROTATIONAL DIRECTION | ALLOW | NOT ACTUATED | $1^{ST}$ GEAR TRAIN | REVERSE | D |

As shown in Table 1, when the controller 9 executes the first forward moving mode, the motor 2 is rotated in the first rotational direction. Transmission of the torque outputted from the motor 2 is blocked by the first one-way clutch 7; hence, transmission of the torque is made through the first torque transmission path 6a. Because of this, the torque converter 3 is actuated, whereby the torque is amplified. The torque, amplified by the torque converter 3, is transmitted to the first gear train 41 through the second torque transmission shaft 5b. The torque is transmitted from the first gear train 41 to the drive wheel 101 through the differential gear 109, whereby the vehicle is moved forward. It should be noted that at this time, the drive unit 100 exerts a drive characteristic indicated by line A depicted in FIG. 8. As is obvious from line A depicted in FIG. 8, the drive unit 100 is enabled to output a high drive force during traveling at low speed in the first forward moving mode; hence, the first forward moving mode is suitable for traveling at low speed.

When the controller 9 executes the second forward moving mode, the motor 2 is rotated in the second rotational direction. Transmission of the torque outputted from the motor 2 is allowed by the first one-way clutch 7; hence, transmission of the torque is made through the second torque transmission path 6b. In other words, the torque is transmitted to the second torque transmission shaft 5b without passing through the torque converter 3. Because of this, the torque converter 3 is not actuated, whereby the torque is not amplified. The torque, transmitted to the second torque transmission shaft 5b, is transmitted to the drive wheel 101 through the second gear train 42 and the differential gear 109. As a result, the vehicle is moved forward. It should be noted that at this time, the drive unit 100 exerts a drive characteristic indicated by line B depicted in FIG. 8. As is obvious from FIG. 8, the second forward moving mode is more suitable for traveling at high speed than the first forward moving mode.

When the controller 9 executes the first reverse moving mode, the motor 2 is rotated in the first rotational direction. Transmission of the torque outputted from the motor 2 is blocked by the first one-way clutch 7; hence, transmission of the torque is made through the first torque transmission path 6a. Because of this, the torque converter 3 is actuated, whereby the torque is amplified. The torque, amplified by the torque converter 3, is transmitted to the second gear train 42 through the second torque transmission shaft 5b. The torque is transmitted from the second gear train 42 to the drive wheel 101 through the differential gear 109, whereby the vehicle is moved backward. It should be noted that at this time, the drive unit 100 exerts a drive characteristic indicated by line C depicted in FIG. 8. As is obvious from line C depicted in FIG. 8, the drive unit 100 is enabled to output a high drive force during traveling at low speed in the first reverse moving mode; hence, the first reverse moving mode is suitable for traveling at low speed. It should be noted that for instance, line C overlaps line B in a higher speed range, although not particularly limited to this setting.

When the controller 9 executes the second reverse moving mode, the motor 2 is rotated in the second rotational direction. Transmission of the torque outputted from the motor 2 is allowed by the first one-way clutch 7; hence, transmission of the torque is made through the second torque transmission path 6b. In other words, the torque is transmitted to the second torque transmission shaft 5b without passing through the torque converter 3. Because of this, the torque converter 3 is not actuated, whereby the torque is not amplified. The torque, transmitted to the second torque transmission shaft 5b, is transmitted to the drive wheel 101 through the first gear train 41 and the differential gear 109. As a result, the vehicle is moved backward. It should be noted that at this time, the drive unit 100 exerts a drive characteristic indicated by line D depicted in FIG. 8. As is obvious from FIG. 8, when a high drive force is not required during traveling at low speed, the second reverse moving mode is more suitable than the first reverse moving mode. It should be noted that for instance, line D overlaps line A in a higher speed range, although not particularly limited to this setting.

[Modifications]

One preferred embodiment of the present invention has been explained above. However, the present invention is not limited to the above, and a variety of changes can be made without departing from the gist of the present invention.

Modification 1

The drive unit 100 can include a control clutch instead of the first one-way clutch 7. The control clutch is disposed in the second torque transmission path 6b and is configured to be controlled by the controller 9.

The control clutch is switchable between a transmission allowing state and a transmission blocking state. In the transmission allowing state, the control clutch allows transmission of the torque outputted from the motor 2. In the transmission blocking state, the control clutch blocks transmission of the torque outputted from the motor 2. When controlled by the controller 9, the control clutch is switched between the transmission allowing state and the transmission blocking state. When the control clutch is switched into the transmission allowing state by the controller 9, transmission of the torque is made through the second torque transmission path 6b. By contrast, when the control clutch is switched into the transmission blocking state by the controller 9, transmission of the torque is made through the first torque transmission path 6a. With the control clutch, the controller 9 is enabled to execute two more modes, composed of a third forward moving mode and a third reverse moving mode, as shown in Table 2 attached below. It should be noted that drive characteristics A to D in Table 2 correspond to lines A to D in FIG. 8, respectively.

passing through the torque converter 3. Because of this, the torque converter 3 is not actuated, whereby the torque is not amplified. The torque, transmitted to the second torque transmission shaft 5b, is transmitted to the drive wheel 101 through the first gear train 41 and the differential gear 109. As a result, the vehicle is moved forward. It should be noted that at this time, the drive unit 100 exerts the drive characteristic indicated by line D depicted in FIG. 8.

When the controller 9 executes the third reverse moving mode, the motor 2 is rotated in the first rotational direction. Transmission of the torque outputted from the motor 2 is allowed by the control clutch; hence, transmission of the torque is made through the second torque transmission path 6b. In other words, the torque is transmitted to the second torque transmission shaft 5b without passing through the

TABLE 2

| CONTROLLER | MOTOR | CONTROL CLUTCH | TORQUE CONVERTER | TORQUE OUTPUT PART | MOVING DIRECTION | DRIVE CHARACTERISTICS |
|---|---|---|---|---|---|---|
| $1^{ST}$ FORWARD MOVING MODE | $1^{ST}$ ROTATIONAL DIRECTION | BLOCK | ACTUATED | $1^{ST}$ GEAR TRAIN | FORWARD | A |
| $2^{ND}$ FORWARD MOVING MODE | $2^{ND}$ ROTATIONAL DIRECTION | ALLOW | NOT ACTUATED | $2^{ND}$ GEAR TRAIN | FORWARD | B |
| $3^{RD}$ FORWARD MOVING MODE | $1^{ST}$ ROTATIONAL DIRECTION | ALLOW | NOT ACTUATED | $1^{ST}$ GEAR TRAIN | FOWARD | D |
| $1^{ST}$ REVERSE MOVING MODE | $1^{ST}$ ROTATIONAL DIRECTION | BLOCK | ACTUATED | $2^{ND}$ GEAR TRAIN | REVERSE | C |
| $2^{ND}$ REVERSE MOVING MODE | $2^{ND}$ ROTATIONAL DIRECTION | ALLOW | NOT ACTUATED | $1^{ST}$ GEAR TRAIN | REVERSE | D |
| $3^{RD}$ REVERSE MOVING MODE | $1^{ST}$ ROTATIONAL DIRECTION | ALLOW | NOT ACTUATED | $2^{ND}$ GEAR TRAIN | REVERSE | B |

The first and second forward moving modes and the first and second reverse moving modes are substantially the same as those in the preferred embodiment described above; hence, the explanation thereof will be hereinafter omitted.

When executing the third forward moving mode, the controller controls and causes the motor 2 to be rotated in the first rotational direction. Besides, the controller 9 causes the motor 2 and the torque output part 4 to output the torque through the second torque transmission path 6a and the first gear train 41. When described in detail, the controller 9 switches the control clutch into the transmission allowing state, whereby transmission of the torque is made through the second torque transmission path 6b. Besides, the controller 9 causes the torque output part 4 to output the torque through the first gear train 41 by controlling the switch mechanism 8.

When executing the third reverse moving mode, the controller 9 controls and causes the motor 2 to be rotated in the first rotational direction. Besides, the controller 9 causes the motor 2 and the torque output part 4 to output the torque through the second torque transmission path 6b and the second gear train 42. When described in detail, the controller 9 switches the control clutch into the transmission allowing state, whereby transmission of the torque is made through the second torque transmission path 6b. Besides, the controller 9 causes the torque output part 4 to output the torque through the second gear train 42 by controlling the switch mechanism 8.

As shown in Table 2, when the controller 9 executes the third forward moving mode, the motor 2 is rotated in the first rotational direction. Transmission of the torque outputted from the motor 2 is allowed by the control clutch; hence, transmission of the torque is made through the second torque transmission path 6b. In other words, the torque is transmitted to the second torque transmission shaft 5b without torque converter 3. Because of this, the torque converter 3 is not actuated, whereby the torque is not amplified. The torque, transmitted to the second torque transmission shaft 5b, is transmitted to the drive wheel 101 through the second gear train 42 and the differential gear 109. As a result, the vehicle is moved backward. It should be noted that at this time, the drive unit 100 exerts the drive characteristic indicated by line B depicted in FIG. 8.

Modification 2

Figure 9:
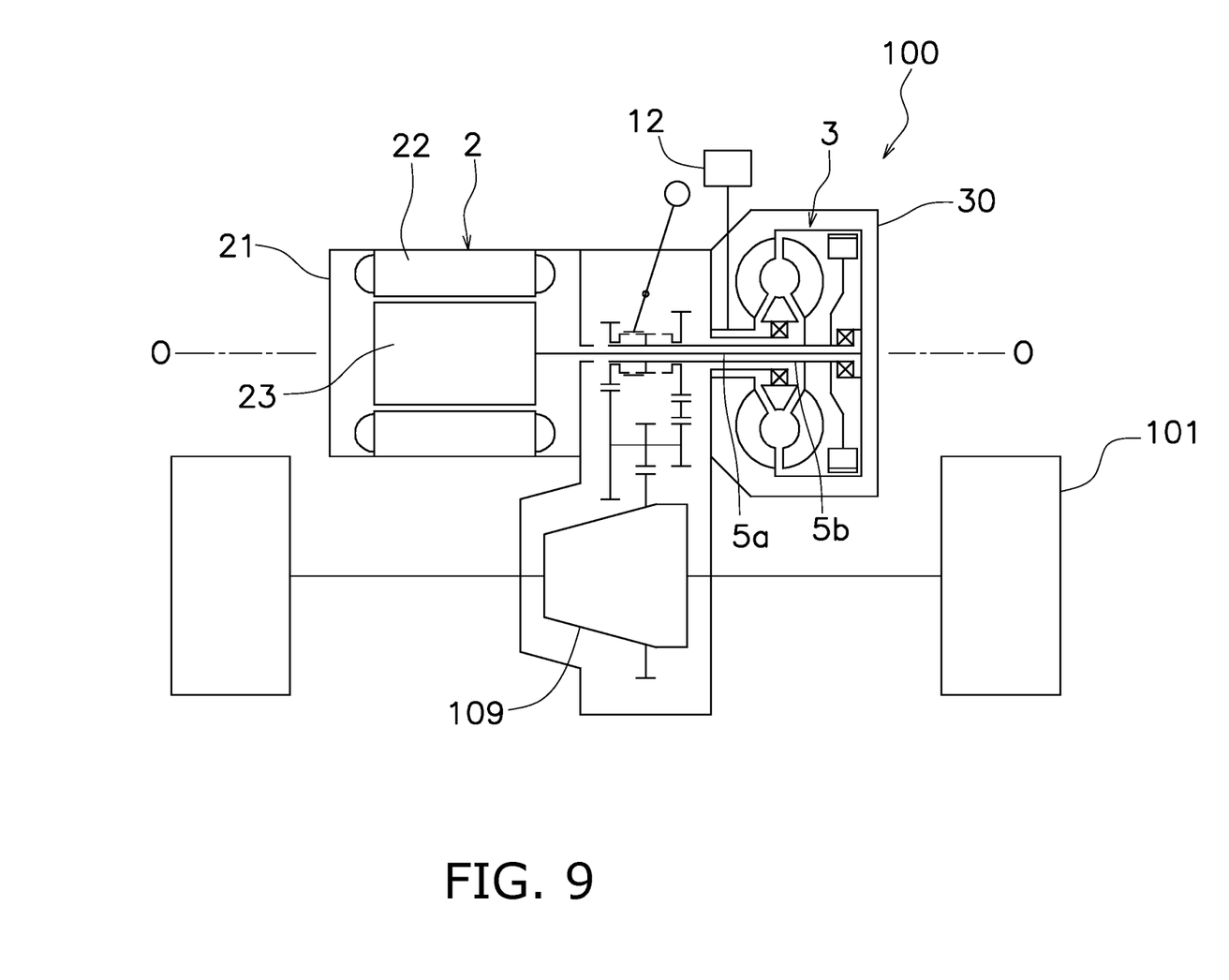
FIG. 9 is a schematic diagram of a drive unit according to a modification.

In the preferred embodiment described above, the impeller 32 includes the supply flow pathways 324. However, the configuration of the impeller 32 is not limited to this. In other words, the impeller 32 may not include the supply flow pathways 324. In this case, as shown in FIG. 9, the drive unit 100 can further include a hydraulic pump 12.

The hydraulic pump 12 is configured to supply hydraulic pressure to the torque converter 3. In other words, the hydraulic pump 12 is configured to supply the hydraulic oil to the interior of the torque converter 3. When the motor 2 is rotated in the second rotational direction, the controller 9 stops actuation of the hydraulic pump 12.

Modification 3

In the preferred embodiment described above, the first gear train 41 is lesser in number of gears by one than the second gear train 42. However, the relation in number of gears between the first gear train 41 and the second gear train 42 is not limited to this. For example, the first gear train 41 can be greater in number of gears by one than the second gear train 42.

REFERENCE SIGNS LIST

2: Motor
3: Torque converter
5b: Second torque transmission shaft

6a: First torque transmission path
6b: Second torque transmission path
7: First one-way clutch
9: Controller
12: Hydraulic pump
41: First gear train
42: Second gear train
100: Drive unit
101: Drive wheel

What is claimed is:

1. A drive unit configured to drive a drive part, the drive unit comprising:
   a motor configured to be rotatable in a first rotational direction and a second rotational direction reverse to the first rotational direction;
   a torque converter configured to amplify a torque outputted from the motor when the torque is directed in the first rotational direction;
   a torque transmission member configured to receive the torque transmitted thereto from the torque converter;
   a first torque transmission path configured to transmit the torque outputted from the motor to the torque transmission member through the torque converter;
   a second torque transmission path configured to transmit the torque outputted from the motor to the torque transmission member without the torque passing through an impeller of the torque converter;
   a first gear train disposed downstream with respect to the torque transmission member in a torque transmission sequence, the first gear train configured to output the torque outputted from the motor when the torque is directed in the first rotational direction as a forward rotation directional torque;
   a second gear train disposed downstream with respect to the torque transmission member in the torque transmission sequence, the second gear train configured to output the torque outputted from the motor when the torque is directed in the first rotational direction as a reverse rotation directional torque; and
   a controller configured to execute a first forward moving mode such that the motor is controlled to be rotated in the first rotational direction and the torque is outputted through the first torque transmission path and the first gear train, the controller further configured to execute a second forward moving mode such that the motor is controlled to be rotated in the second rotational direction and the torque is outputted through the second torque transmission path and the second gear train.

2. The drive unit according to claim 1, further comprising:
   a one-way clutch disposed in the second torque transmission path, the one-way clutch configured to allow transmission of the torque outputted from the motor when the torque is directed in the second rotational direction and block transmission of the torque outputted from the motor when the torque is directed in the first rotational direction.

3. The drive unit according to claim 1, further comprising:
   a control clutch disposed in the second torque transmission path, the control clutch configured to be controlled by the controller, wherein
   the control clutch is switchable between a transmission allowing state and a transmission blocking state, the control clutch allowing transmission of the torque outputted from the motor when switched into the transmission allowing state, the control clutch blocking transmission of the torque outputted from the motor when switched into the transmission blocking state, and
   the controller is further configured to execute a third forward moving mode such that the motor is controlled to be rotated in the first rotational direction and the torque is outputted through the second torque transmission path and the first gear train.

4. The drive unit according to claim 1, wherein the controller is further configured to execute a first reverse moving mode such that the motor is controlled to be rotated in the first rotational direction and the torque is outputted through the first torque transmission path and the second gear train, the controller further configured to execute a second reverse moving mode such that the motor is controlled to be rotated in the second rotational direction and the torque is outputted through the second torque transmission path and the first gear train.

5. The drive unit according to claim 1, wherein the first gear train is higher in gear ratio than the second gear train.

6. The drive unit according to claim 1, wherein a ratio of a first gear ratio of the first gear train to a second gear ratio of the second gear train is lower than a torque ratio of the torque converter.

7. The drive unit according to claim 1, further comprising:
   a hydraulic pump configured to supply a hydraulic pressure to the torque converter, wherein the controller is configured to stop actuation of the hydraulic pump when the motor is rotated in the second rotational direction.

* * * * *